(No Model.)

B. F. RICE.
STRAP ATTACHMENT.

No. 308,381. Patented Nov. 25, 1884.

Witnesses:
W. E. Langley.
P. J. Sunstrom.

Inventor:
Benjamin F. Rice

UNITED STATES PATENT OFFICE.

BENJAMIN F. RICE, OF STILLWATER, MINNESOTA.

STRAP ATTACHMENT.

SPECIFICATION forming part of Letters Patent No. 308,381, dated November 25, 1884.

Application filed March 24, 1884. (No model.)

*To all whom it may concern:*

Be it known that I, BENJAMIN F. RICE, residing at Stillwater, in the county of Washington and State of Minnesota, have invented a new and useful Improvement in Attachments for Harness-Straps, of which the following is a full, clear, and exact description, reference being had to the accompanying drawings.

My invention relates to a device adapted to be attached to a strap having a buckle and two loops, for the purpose of preventing the strap from wearing where it passes through a ring, hame-loop, &c. In previous inventions of this nature it has been necessary to rivet the device to the strap, which, at the outset, involves an expenditure of time and labor, and when a device thus fastened has to be detached a number of tools and considerable time are again required.

Figure 1:
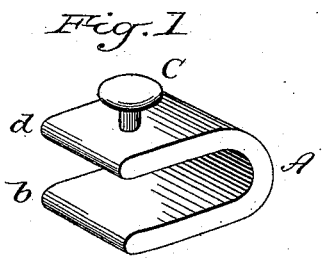

The object of my invention is to provide a device for the above purpose so constructed that it can be instantly adjusted to a strap and instantly detached therefrom. I accomplish this object by constructing the device as illustrated in Figure 1, which shows the device disconnected from the strap.

A is a metal hook, having a stud, C, by means of which the hook is attached to the strap. This stud has an elongated wedge-shaped head set at right angles to the length of the hook. The hook and the stud are cast in one piece. The lower prong, $b$, of the hook is a little longer than the upper one, $d$, to prevent the hook from tipping forward when the strap is strained.

To attach the hook to the strap, the head of the stud is inserted through a longitudinal slit in the strap, and the hook is then turned to its normal position, when the longest dimension of the head of the stud lies at right angles to the length of the slit, rendering it impossible for the head to escape from the slit. This device is useful to prevent wear upon a strap which passes through a ring, triangle, &c., and it is especially valuable as an attachment to a hame-strap, to prevent the buckle from crowding over to the opposite side when the strap is being tightened. The essential value of my improvement, however, consists in the facility with which the device can be attached and detached.

Figure 2:
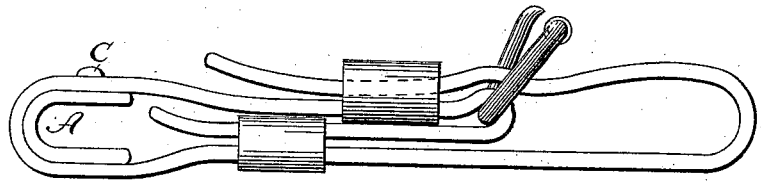

Fig. 2 represents my improved attachment adjusted to a hame-strap.

A is the hook, and C is the head of the stud protruding above the strap.

To detach the device, the strap is loosened, and the hook A is turned at right angles to its present position, when the stud may be readily drawn out of the slit.

Having thus fully described and illustrated my invention, I claim as new and desire to secure by Letters Patent—

The improved strap attachment consisting of the hook A, provided with the integral stud C, adapted for use substantially as shown and described.

BENJAMIN F. RICE.

Witnesses:
ALLEN HUEY,
W. E. LANGLEY.